(12) United States Patent
Ollila

(10) Patent No.: US 9,746,689 B2
(45) Date of Patent: Aug. 29, 2017

(54) MAGNETIC FLUID OPTICAL IMAGE STABILIZATION

(71) Applicant: Intel Corporation, Santa Clara, CA (US)

(72) Inventor: Mikko Ollila, Tampere (FI)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/863,884

(22) Filed: Sep. 24, 2015

(65) Prior Publication Data
US 2017/0090211 A1    Mar. 30, 2017

(51) Int. Cl.
G02B 27/64    (2006.01)
G02B 7/08    (2006.01)
H02K 41/035    (2006.01)

(52) U.S. Cl.
CPC ............. G02B 27/646 (2013.01); G02B 7/08 (2013.01); H02K 41/0356 (2013.01)

(58) Field of Classification Search
CPC ........ G02B 27/64; G02B 27/646; G02B 7/04; G02B 7/08; G02B 7/09–7/105; H02K 41/0354; H02K 41/0356; H04N 5/23264; H04N 5/2328; H04N 5/23287; G03B 2205/00; G03B 2205/0007–2205/0023; G03B 2205/0053; G03B 2205/0069

See application file for complete search history.

(56) References Cited

U.S. PATENT DOCUMENTS

| | | | |
|---|---|---|---|
| 4,730,897 A | 3/1988 | McKechnie et al. | |
| 6,987,613 B2 | 1/2006 | Pocius et al. | |
| 7,387,695 B2 | 6/2008 | Iwakawa et al. | |
| 7,773,489 B2 | 8/2010 | Murata et al. | |
| 7,896,524 B2 | 3/2011 | Yoneda et al. | |
| 8,748,921 B2 | 6/2014 | Martin et al. | |
| 2002/0196720 A1 | 12/2002 | Takeshita | |
| 2004/0174614 A1* | 9/2004 | Hovanky | G03B 3/10 359/694 |
| 2005/0201109 A1 | 9/2005 | Shimura | |
| 2011/0122495 A1 | 5/2011 | Togashi | |
| 2014/0022645 A1 | 1/2014 | Matsuura et al. | |

(Continued)

FOREIGN PATENT DOCUMENTS

JP    2000057602 A    2/2000
JP    2011141910 A    7/2011

(Continued)

OTHER PUBLICATIONS

International Search Report, PCT No. PCT/US2016/044525, mailing date Oct. 12, 2016, 3 pages (INTC:1525PCT).

(Continued)

Primary Examiner — Stephone B Allen
Assistant Examiner — Adam W Booher
(74) *Attorney, Agent, or Firm* — International IP Law Group, P.L.L.C.

(57) ABSTRACT

Techniques related to a method, apparatus, and systems for magnetic fluid shutter operation are described herein. For example, an apparatus may include a magnet, a ferrofluid and a coil. The ferrofluid may surround the magnet. Additionally, the coil may be disposed near the ferrofluid, wherein in response to a current through coil, the magnet is to shift a lens.

22 Claims, 6 Drawing Sheets

(56) References Cited

U.S. PATENT DOCUMENTS

2014/0231846 A1    8/2014    Lin
2014/0239336 A1    8/2014    Streppel et al.

FOREIGN PATENT DOCUMENTS

| JP | 5634108 | 12/2014 |
|---|---|---|
| JP | 2014232716 A | 12/2014 |
| KR | 20000020036 A | 4/2000 |
| KR | 20090047236 | 5/2009 |
| WO | 0024062 A1 | 4/2000 |
| WO | 2015101899 A1 | 7/2015 |

OTHER PUBLICATIONS

International Search Report, PCT No. PCT/US2016/044522, mailing date Nov. 4, 2016, 3 pages (INTC:1524PCT).

Ollila, Mikko; U.S. Appl. No. 14/747,266 entitled "Ferrofluid Material Interface for Magnetic Shape-Memory Element Configuration" Filed in the USPTO on Jun. 23, 2015, US Application, Drawings and Filing Receipt date Jul. 23, 2015, 40 pages.

Ollila, Mikko; U.S. Appl. No. 14/747,234 entitled "Magnetic Fluid Shutter Operation" Filed in the USPTO on Jun. 23, 2015, US Application, Drawings and Filing Receipt dated Jul. 6, 2015, 28 pages.

Ollila, Mikko; U.S. Appl. No. 14/863,944 entitled "MEMS Led Zoom" Filed in the USPTO on Sep. 24, 2015, US Application, Drawings and Filing Receipt dated Oct. 9, 2015, 35 pages.

* cited by examiner

MAGNETIC FLUID OPTICAL IMAGE STABILIZATION

TECHNICAL FIELD

The present techniques generally relate to image capture devices. More specifically, the present techniques relate to optical image stabilization and auto focus.

BACKGROUND

Image capture devices may be found in various computing devices, such as those with small form factors. These computing devices typically include optical image stabilization mechanisms as well as auto focus mechanisms. The optical image stabilization and auto focus functionality can be realized with mechanical components such as moving platforms and ball bearings.

BRIEF DESCRIPTION OF THE DRAWINGS

In some cases, the same numbers are used throughout the disclosure and the figures to reference like components and features. For example, numbers in the 100 series refer to features originally found in FIG. 1; numbers in the 200 series refer to features originally found in FIG. 2; and so on.

DESCRIPTION OF THE EMBODIMENTS

Figure 1:
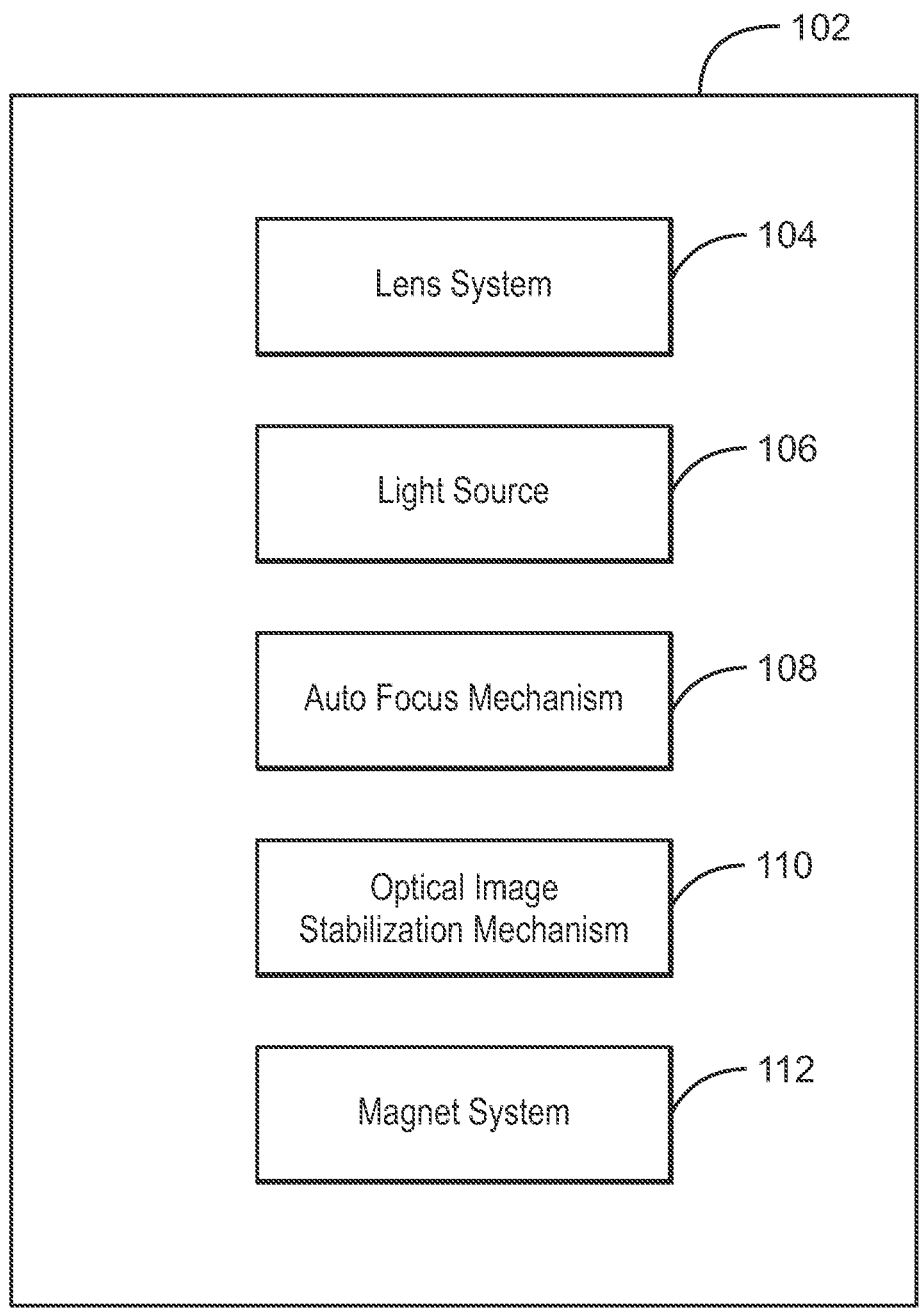
FIG. 1 is a block diagram of a ferrofluid imaging system.

A large number of computing devices include cameras that take advantage of optical image stabilization. Typically, optical image stabilization mechanisms are based on moving platforms implemented by ball bearings or wire springs. There are various problems related to the typical mechanical implementations. For example, ball bearings need various surface treatments to cope with wear and tear and they may still produce dust inside the imaging system. Additionally, the assembly is difficult and robustness can be challenging as the mechanical systems may get "stuck" as a result of hard mechanical shock. Further, ball bearings produce sounds that very sensitive microphones in device will pick up and one can hear the sounds on playback. Wire springs associated with optical image stabilization are also difficult to assemble and source for instability and reliability problems. In particular, the spring is difficult to cut on correct length resulting in tilted lens that and they experience deformation in drop shocks. Typically the optical image stabilization structure requires four to eight magnets, with half of the magnets used for autofocus, and half for optical image stabilization. Several springs are also needed.

Embodiments described herein enable optical image stabilization and autofocus via a magnetic fluid. In embodiments, the fluid is a ferrofluid. The magnetic fluid enables smart bearing that are robust, reliable, and without mechanical wear and tear. Moreover, the magnetic fluid provides drop resistant smart elevation support for lens contrary to wire spring support of prior art, which is not needed. The magnetic fluid also elevates the lens.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 is a block diagram of a ferrofluid imaging system 100. The ferrofluid imaging system 100 includes non-moving, adaptive parts that are used to enable a camera function. As used herein, the camera function refers to capturing an image. In embodiments, the image can be a still shot, a series of still shots, or a video. The camera includes a field of view that is the subject of image capture.

The ferrofluid imaging system may be located within a housing 102. The housing 102 can be coupled with a printed circuit board (PCB) of a computing device. The ferrofluid imaging system 100 also includes a lens system 104. The lens system 104 may be located near an aperture of the ferrofluid imaging system 100. Opening of the aperture may expose light to an imaging sensor though the lens system 104. Image capture is performed via the image sensor receiving light and an associated image through the aperture. In embodiments, the lens system 108 may include any number of lenses. For example, the lens system may include an active lens, with electrical conductors that enable the adjusting, alternating, or tuning of the light passed through the lens through via the application of electricity to circuitry of the active lens. The lens system 104 may also include a collimation lens that is to collimate or partially collimate light from a light source 106. In embodiments, the collimation lens may be a Fresnel lens. The light source 106 may be any light source, such as a light emitting diode (LED). The light source may be used to enable a flash to enhance image capture by the ferrofluid imaging system 100. In embodiments, the collimation lens may converge light from the light source 106, and the active lens may focus or diverge the collimated light from the collimation lens, as necessary based on the location of the image capture subject and the ambient light in the environment of the image capture subject.

The ferrofluid imaging system also includes an autofocus mechanism 108 and an optical image stabilization mechanism 110. Each of the autofocus mechanism 108 and the optical image stabilization mechanism 110 are enabled via a magnetic fluid, such as a ferrofluid.

A ferrofluid, as referred to herein, is a ferromagnetic fluid configured to react to the presence of a magnetic field. In the techniques described herein, a ferrofluid is used to move the lens system of a cameral module. By moving, elevating, or tilting the lens system, the lens position can be finely tuned to realize autofocus and optical image stabilization functionality. A magnetic field may be generated by coils disposed near a plurality of ferrofluid movement locations. As current is applied to the coils, the ferrofluid may change disposition as a magnetic flux associated with the magnetic field propagates through the ferrofluid. In some cases, magnets are used to shape the magnetic field and direct the propagation of the magnetic flux. In other words, when current is applied to the coil, the ferrofluid will cause movement of the lens. When current is reversed or removed from the coil, the ferrofluid may return the lens to an original position. Although the present techniques may be described using a ferrofluid, any magnetic fluid may be used according to the techniques described herein. Moreover, each of the autofocus mechanism 108 and the optical image stabilization mechanism 110 may include a separate and distinct set of ferrofluid locations to enable each mechanism independent of the other.

The ferrofluid imaging system 100 also includes a magnet system 112. The magnet system 112 enables smart bearings to realize the autofocus mechanism 108 and the optical image stabilization mechanism 110. The magnets can be moved via the ferrofluid, which provides the smart bearing functionality. The ferrofluid also enables drop resistance smart elevation support for the lens system by place ferrofluid around a magnet coupled with the lens system, such that the magnet can be elevated by the ferrofluid.

In embodiments, a magnet in the magnetic field created by (z) focus coiling can be elevated or moving up and down to provide the focus mechanism. In embodiments, a magnet may be disposed in the magnetic field of x-y coiling to enable optical image stabilization mechanism. In this case, a spring may be added to the ferrofluid imaging system in order to shorten the clearance between magnet and coil, and thus produce an additional more mechanical force. The focus (z) coil would need to work against this spring for focusing. In embodiments, two magnets may be used for optical image stabilization, one for the Z-axis and one for Y-axis. Additionally, in embodiments, the optical image stabilization mechanism may be realized by tilting the lens via unequal or unbalanced Z coiling currents on the opposite sides of the lens system. In this case XY coiling can be omitted, and smart elevation is implemented. In this scenario, at least 4 magnets would be used. Further, in embodiments, the XY and tilt optical image stabilization may be combined with a single set of magnets. The combination of XY and Z coiling can create both tilt and XY shift for the optical image stabilization mechanism, thereby providing a larger correction angle than conventional systems which only utilize one of the two principles of tilt and shift.

Figure 2:
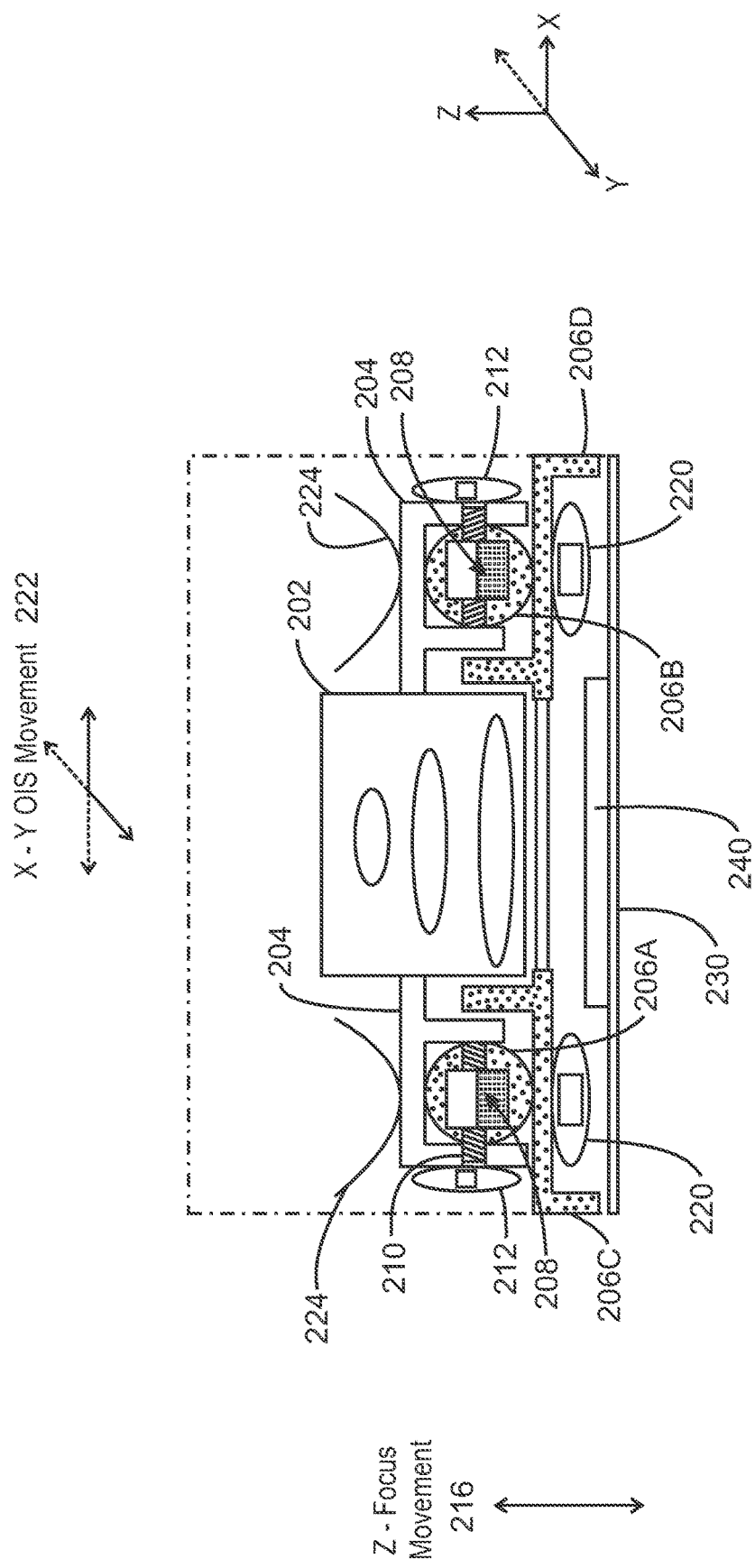
FIG. 2 is a block diagram of an ferrofluid imaging system including a ferrofluid autofocus and optical image stabilization.

FIG. 2 is a block diagram of a ferrofluid imaging system 200 including a ferrofluid autofocus and optical image stabilization. As discussed above, a ferrofluid imaging system with ferrofluid, may be used to move a lens system 202 as necessary to enable an autofocus and optical image stabilization functionality. The lens system 202 may be coupled with a moving platform 204. As illustrated in FIG. 2, the moving platform appears in solid black on both sides of the lens system 202. Ferrofluid movement locations are illustrated with dotted areas. In particular, locations 206A, 206B, 206C, and 206D each represent areas of ferrofluid within the ferrofluid imaging system 200. The moving platform 204 may be located atop of a printed circuit board (PCB) 230. An image sensor 240 may be located immediately below the lens system 302.

Magnets 208 are placed in a pocket created by a fixed base 210 portion of the moving platform 204. The fixed base is coupled with the moving platform and illustrated by diagonal lines on the fixed base 208. The fixed base is used to hold the magnet relative to the moving platform 204. Ferrofluid is injected close to the magnets 208, and the magnets 208 attract the ferrofluid when the ferrofluid is subject to a magnetic field that is generated by coils 212 disposed near the ferrofluid movement locations. As current is applied to the coils, the ferrofluid may change disposition as a magnetic flux associated with the magnetic field propagates through the ferrofluid. The movement of the ferrofluid causes the moving platform 204 to elevate along a Z-axis of movement as indicated at reference number 216. The coils 212 are used to control the height of elevation of the lens system via control of the amount of current applied to the coils. In this manner, the lens system 202 can be focused. In embodiments, the magnetic field of the coil may also create a force on the magnet causes movement of the moving platform. As a result, the movement may be a result of the ferrofluid, the magnet, or a combination of both the ferrofluid and magnet.

When current is applied to this fixed coil the magnet experience the force that either lifts or lowers the magnet. This force is counter force to the elevation force created by ferrofluid. Fluid that is attracted by magnet delivers the movement to moving platform that lifts the lens and provides focusing. While the magnets 208 are illustrated as being attached to a fixed base 210 portion of the moving platform 204, the magnets may also be fixed directly onto the moving platform 204.

Similarly, another set of coils 220 are to create a magnetic field that shifts a plurality of magnets (not illustrated) along each of an X-axis and a Y-axis. The coils 220, when enabled with current, will create magnetic field that pushes the plurality of magnets in the X-axis or the Y-axis to achieve the X-Y optical image stabilization movement indicated at reference number 222. Thus, the coils 220 can be used to shift the lens system 202 to realize an optical image stabilization functionality. In embodiments, there is at least one magnet per the X-axis and the Y-axis. Moreover, in embodiments, the optical image stabilization can be enabled by either shifting the lens about +−100 um on top of fixed image sensor or tilt (about 0.5 degrees) the lens on top of image sensor.

In embodiments, the optical image stabilization movement 222 is a function of a clearance between the respective coil 220 and magnet. In such a scenario, an optional spring system 224 may be used to push the X-axis magnet, the Y-axis magnet, and the platform as close as possible to each coil 220. In this manner, mechanical force generation along the X-axis and the Y-axis is the maximized. In embodiments, the focus coils 212 may enable a counter force against spring together with elevation force generated by ferrofluid. In embodiments, the coil 212 does not push the lens to the very end of optical range of the lens. Rather, the change of current direction in a coil will change the magnetic force direction either counter or forward direction of spring force. For example, without a spring, the lens would likely be on a macro distance setting, such as 10 cm. The macro distance setting is the focus point when lens is most far distance from sensor. A current of about 100 mA would need to be applied to the coil to move the lens to the about 150 um from the macro distance setting. However, if the spring is pushing the lens half way to about 75 um, a smaller current such as +−50 mA (changing current direction) could be used to operate the lens throughout the entire focus range from infinity to macro, moving from 0 to 150 um, with only half of peak current and power.

Figure 3:
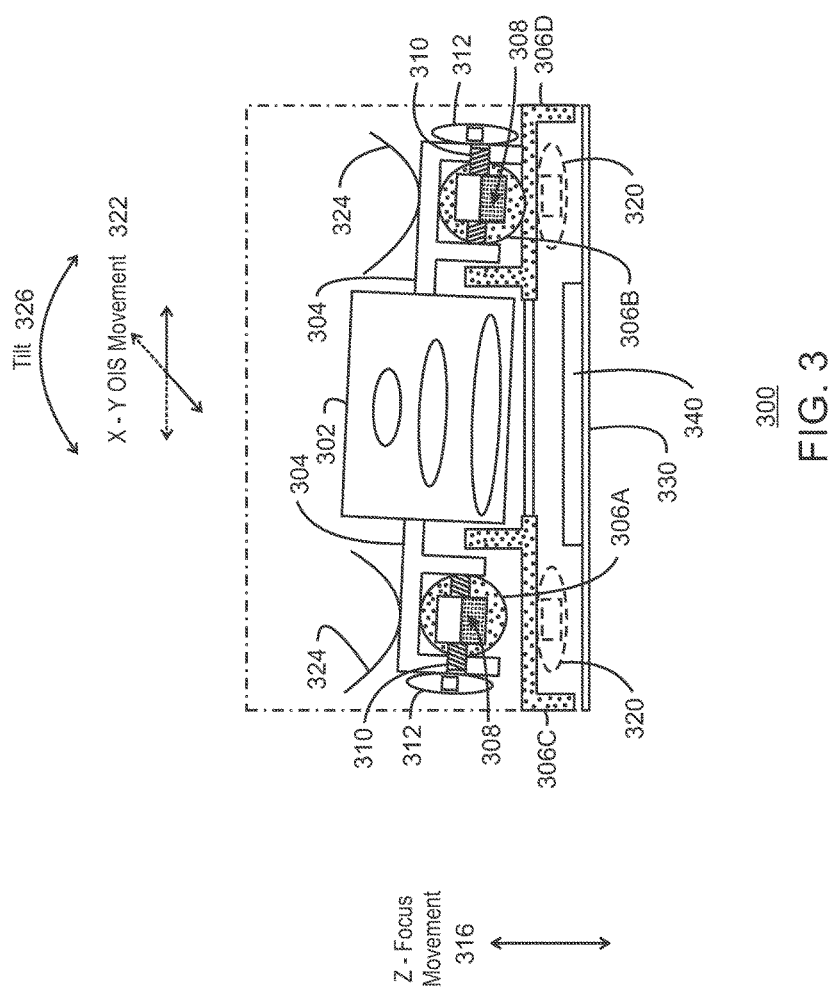
FIG. 3 is a block diagram of an ferrofluid imaging system including a ferrofluid autofocus and tilt optical image stabilization.

FIG. 3 is a block diagram of a ferrofluid imaging system 300 including a ferrofluid autofocus and tilt optical image stabilization. The ferrofluid of the ferrofluid imaging system 300 may be used to move a lens system 302 as necessary to enable an autofocus and optical image stabilization functionality. The lens system 302 may be coupled with a moving platform 304. The moving platform 304 may be located atop of a printed circuit board (PCB) 330. An image sensor 340 may be located immediately below the lens system 302. As illustrated in FIG. 3, the moving platform 304 appears in solid black on both sides of the lens system 302. Ferrofluid movement locations are illustrated with dotted areas. In particular, locations 306A, 306B, 306C, and 306D each represent areas of ferrofluid within the ferrofluid imaging system 300. Magnets 308 are placed in a pocket created by a fixed base 310 portion of the moving platform 304. The fixed base 310 is coupled with the moving platform and illustrated by diagonal lines on the fixed base 310. The fixed base is used to hold the magnet relative to the moving platform 304.

Similar to FIG. 2, ferrofluid is injected close to the magnets 308, and the magnets 308 attract the ferrofluid when the ferrofluid is subject to a magnetic field may be generated by coils 312 disposed near the ferrofluid movement locations. As current is applied to the coils, the ferrofluid may change disposition as a magnetic flux associated with the magnetic field propagates through the ferrofluid. The movement of the ferrofluid causes the moving platform 304 to elevate along a Z-axis of movement as indicated at reference number 316. In embodiments, the magnetic field of the coil may also create a force on the magnet causes movement of the moving platform. As a result, the movement may be a result of the ferrofluid, the magnet, or a combination of both the ferrofluid and magnet. The coils 312 are used to control the height of elevation of the lens system via control of the amount of current applied to the coils. In this manner, the lens system 302 can be focused.

In FIG. 3, the two magnets 308 enables the lens system 302 to tilt. The tilt is illustrated by the tilt 326 arrow. The tilt 326 movement can be coupled with a z movement 316 to enable an enhanced optical image stabilization function. In other words, optical image stabilization is enabled via a tilting of the lens in addition to focusing. In embodiments, one side of coil 312 is set by current with an amplitude that is equal to a DC current plus an offset. The opposite coil 312 is set with an amplitude that is equal to a DC current minus an offset. The offset current results in elevating the lens is elevated by some amount to provide focusing, and also a tilt according to a particular angle due to imbalance of forces created by unequal currents. The unequal currents result in different magnetic fields at the coils 308. Put another way, when current is applied to the fixed coils at a positive and negative offset, the magnets experience a force that either lifts or lowers the magnet in an unbalanced fashion due to the unbalanced currents.

In embodiments, the XY coils 320 can be enabled to provide an additional degree of optical image stabilization correction. Thus, the present techniques enable an optical image stabilization with a combination of tilt 326, XY optical image stabilization movement 322, and Z-focus movement 316. The resulting correction angle from the combination of tilt and shift principles is greater than in conventional implementations of optical image stabilization. An optional spring system 324 may be used to push the X-axis magnet, the Y-axis magnet, and the platform as close as possible to each coil 320.

Figure 4:
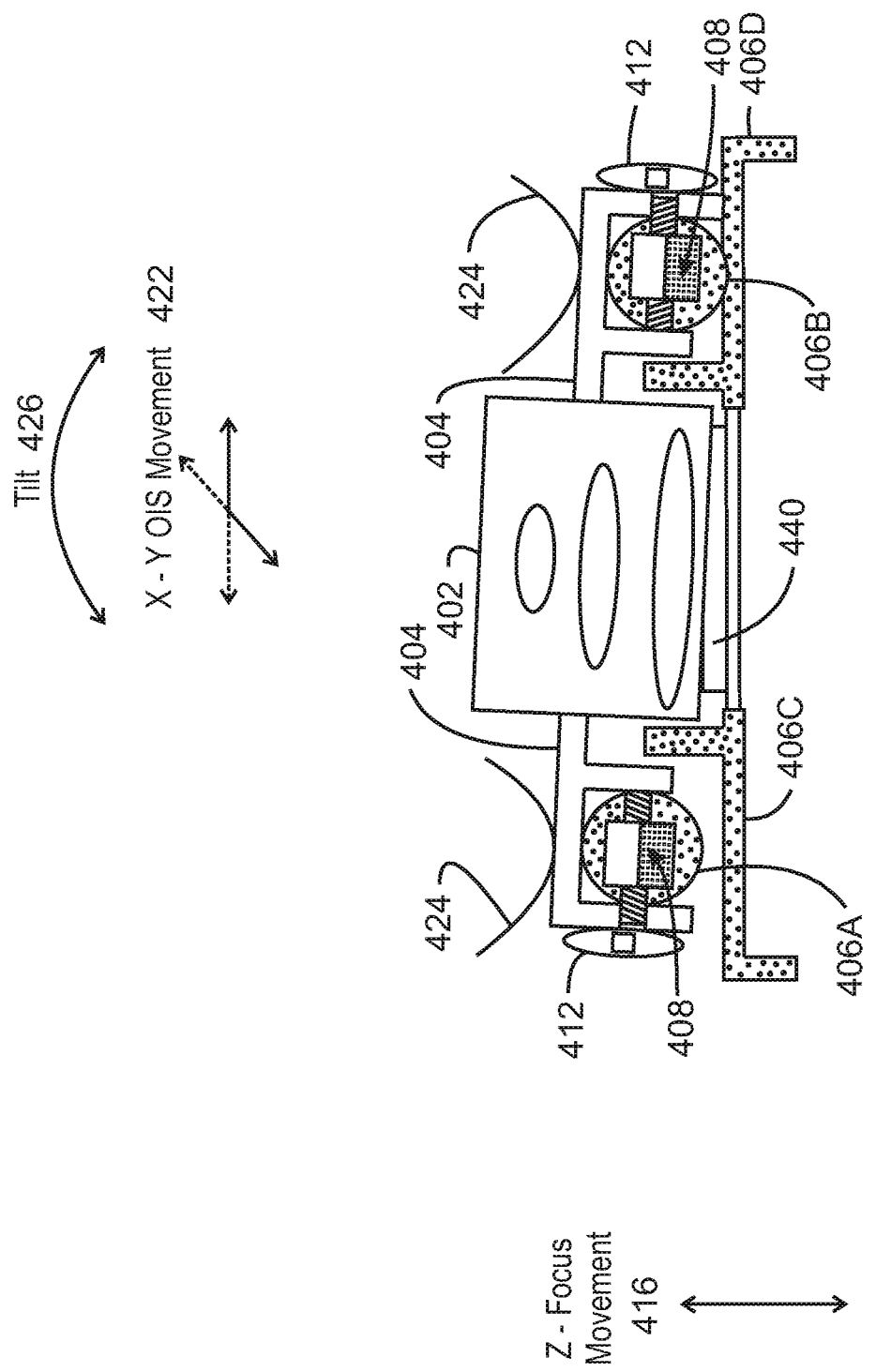
FIG. 4 is a block diagram of a ferrofluid imaging system including a ferrofluid autofocus and tilt optical image stabilization, with a full module tilt.

FIG. 4 is a block diagram of a ferrofluid imaging system 400 including a ferrofluid autofocus and tilt optical image stabilization, with a full module tilt. Similar to FIG. 3, the ferrofluid imaging system 400 includes a tilt function for optical image stabilization and an optional spring system 424. In FIG. 4, the two magnets 408 enables a full camera module 402 to tilt via a moving platform 404. In particular, locations 406A, 406B, 406C, and 406D each represent areas of ferrofluid within the ferrofluid imaging system 400. The full camera module 402 will be discussed in detail below. The tilt is illustrated by the tilt 426 arrow. The tilt 426 movement can be coupled with a Z movement 416 to enable an enhanced optical image stabilization function as indicated by XY optical image stabilization movement 422. In other words, optical image stabilization is enabled via a tilting of the lens in addition to focusing. In embodiments, one side of coil 412 is set by current with an amplitude that is equal to a DC current plus an offset. The opposite coil 412 is set with an amplitude that is equal to a DC current minus an offset. The offset current results in elevating the lens is elevated by some amount to provide focusing, and also a tilt according to a particular angle due to imbalance of forces created by unequal currents. The unequal currents result in different magnetic fields at the coils 408.

The ferrofluid imaging system 400 includes a full camera module 402 that includes an imaging sensor 440 integrated within the full camera module 402. The full camera module may include all connectors or leads, an active lens, a collimation lens, a light source, and a controller to control signals between the module and computing device components outside of the module 402.

Figure 5:
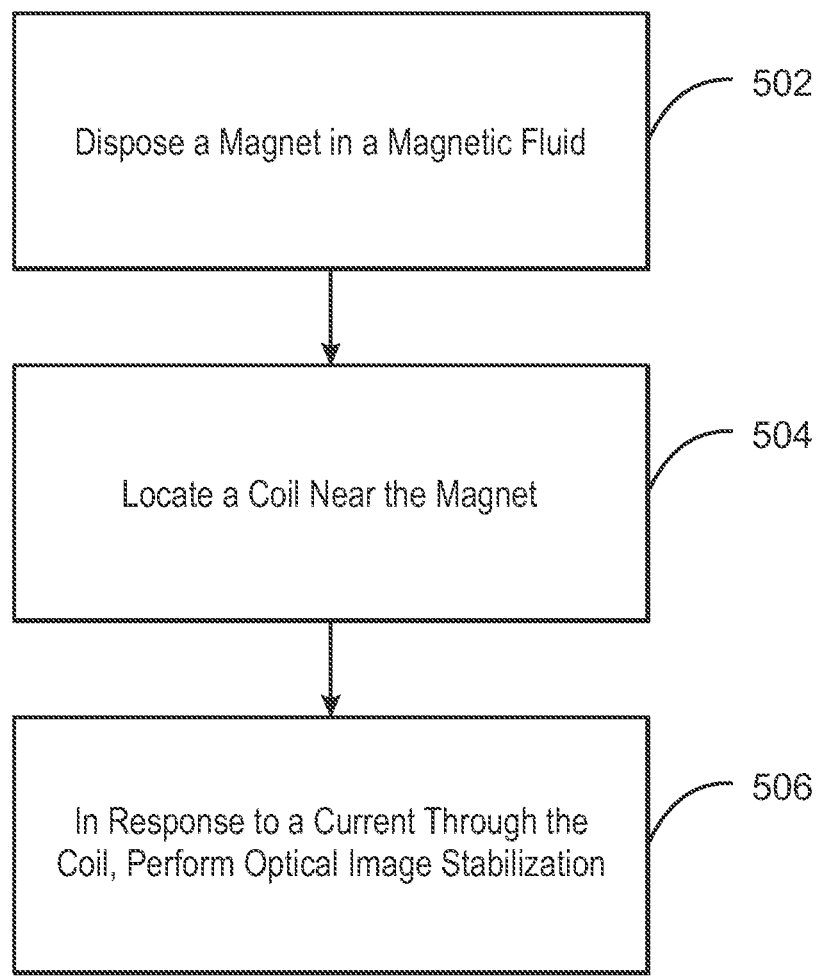
FIG. 5 is a process flow diagram of implementing a ferrofluid imaging system.

FIG. 5 is a process flow diagram of a method 500 that implements a ferrofluid imaging system. At block 502, a magnet is disposed in a magnetic fluid. In embodiments, the magnetic fluid is a ferrofluid. At block 504, a coil is located near the magnet. In embodiments, a current through the coil can cause movement of the magnet. The movement of the magnet is based on an amplitude of the current through the coil near the magnet. The magnet may be attached to a platform or a lens system, and movement of the magnet is to cause movement of the platform or lens system. Accordingly, at block 506, in response to a current through the coil, optical image stabilization of a lens system is performed. In embodiments, in response to a current through the coil, autofocus of a lens system is performed.

Figure 6:
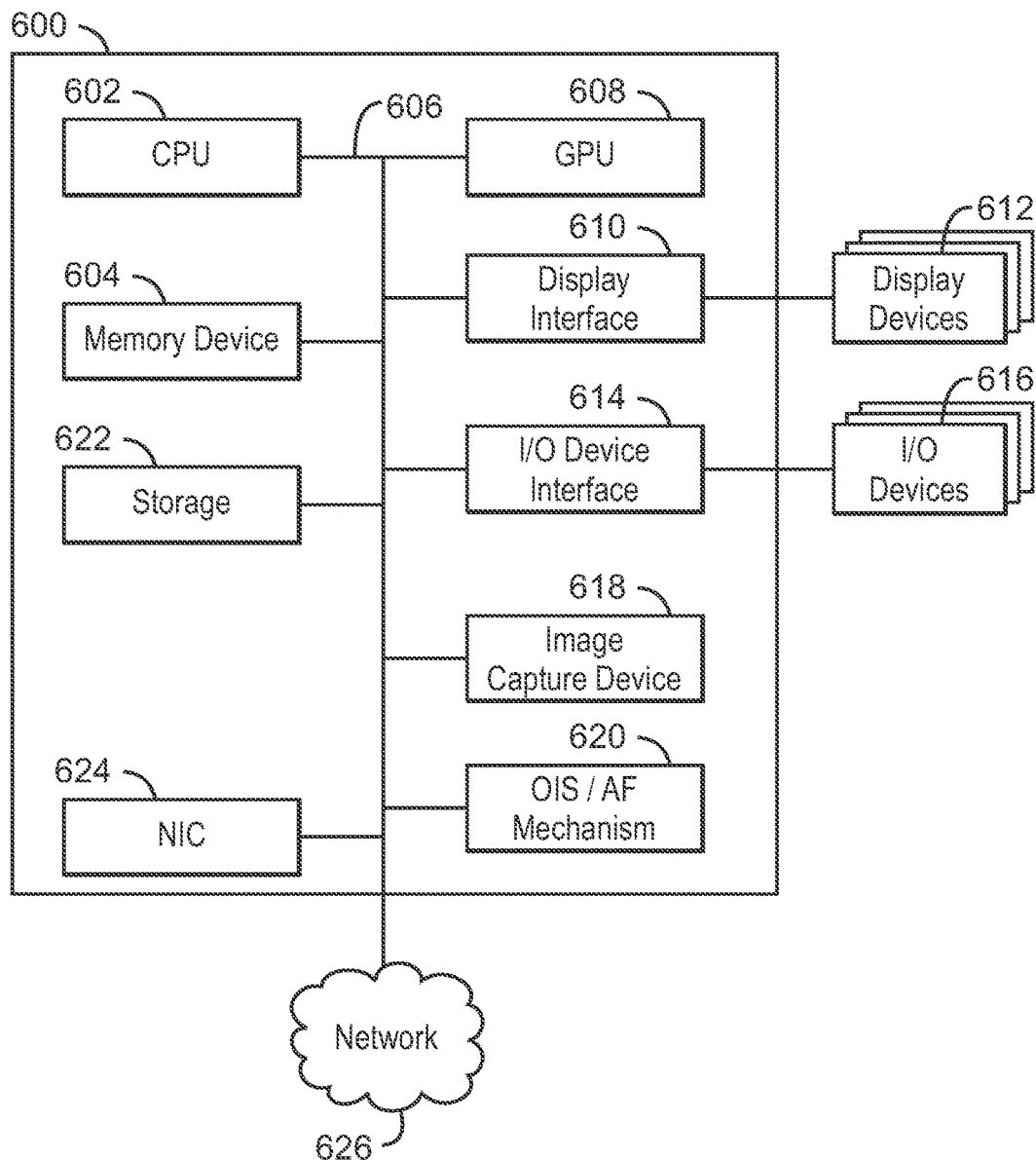
FIG. 6 is a block diagram of a computing device that includes a ferrofluid imaging system.

FIG. 6 is a block diagram of a computing device 600 that includes a ferrofluid imaging system. The computing device 600 can be, for example, a laptop computer, desktop computer, tablet computer, mobile device, or server, among others. In particular, the computing device 600 can be a mobile device such as a cellular phone, a smartphone, a personal digital assistant (PDA), phablet, or a tablet. The computing device 600 can include a central processing unit (CPU) 602 that is configured to execute stored instructions, as well as a memory device 604 that stores instructions that are executable by the CPU 602. The CPU can be coupled to the memory device 604 by a bus 606. Additionally, the CPU 602 can be a single core processor, a multi-core processor, a computing cluster, or any number of other configurations. Furthermore, the computing device 600 can include more than one CPU 602. The memory device 604 can include random access memory (RAM), read only memory (ROM), flash memory, or any other suitable memory systems. For example, the memory device 604 can include dynamic random access memory (DRAM).

The computing device 600 can also include a graphics processing unit (GPU) 608. As shown, the CPU 602 can be coupled through the bus 606 to the GPU 608. The GPU 608 can be configured to perform any number of graphics operations within the computing device 600. For example, the GPU 608 can be configured to render or manipulate graphics images, graphics frames, videos, or the like, to be displayed to a user of the computing device 600. In some embodiments, the GPU 608 includes a number of graphics engines, wherein each graphics engine is configured to perform specific graphics tasks, or to execute specific types of workloads.

The CPU 602 can be linked through the bus 606 to a display interface 610 configured to connect the computing device 600 to a display device 612. The display device 612 can include a display screen that is a built-in component of the computing device 600. The display device 612 can also include a computer monitor, television, or projector, among others, that is externally connected to the computing device 600.

The CPU 602 can also be connected through the bus 606 to an input/output (I/O) device interface 614 configured to connect the computing device 600 to one or more I/O devices 616. The I/O devices 616 can include, for example, a keyboard and a pointing device, wherein the pointing device can include a touchpad or a touchscreen, among others. The I/O devices 616 can be built-in components of the computing device 600, or can be devices that are externally connected to the computing device 600.

The computing device also includes an image capture device 618. The image capture device 618 may be a still shot camera, 3D camera, video recording device, and the like. In embodiments, the computing device 600 also includes an infrared device to support the 3D camera. The image capture device 618 is coupled with an optical image stabilization and/or autofocus mechanism 620. The mechanism 620 can include a plurality of magnets and ferrofluid pockets to enable optical image stabilization and/or autofocus of the image capture device 618.

The computing device also includes a storage device 622. The storage device 622 is a physical memory such as a hard drive, a solid state drive, an optical drive, a thumbdrive, an array of drives, or any combinations thereof. The storage device 622 can also include remote storage drives such as used for cloud computing applications. The storage device 622 includes any number of applications that are configured to run on the computing device 600.

The computing device 600 can also include a network interface controller (NIC) 624. The NIC 624 can be configured to connect the computing device 600 through the bus 606 to a network 626. The network 626 can be a wide area network (WAN), local area network (LAN), or the Internet, among others.

The magnetic fluid imaging system results in an easy assembly and manufacture, as there are fewer parts and the difficulties of wire spring cutting and ball bearing pick and placement is avoided. Additionally, since there are fewer parts when compared to traditional optical image stabilization and autofocus mechanisms, the cost is lower than traditional systems. In embodiments, a pure autofocus spring is avoided, as the ferrofluid can be used to produce a counter force for autofocus. Moreover, in embodiments, the same magnet may be used for several functions. For example, a single magnet can be used for support, spring, ball bearing, and moving the lens for autofocus and optical image stabilization.

Moreover, the number of magnets in the system is variable, as one magnet can do all optical image stabilization and autofocus functions, since movement in the Z direction can also create optical image stabilization with tilt. In traditional systems, the use of a wire spring would not allow lens tilting. Further, the magnetic fluid imaging system results in a robust system, as there is no permanent deformation of the ferrofluid ball bearings, as the fluid will return to magnet once current is removed the coil. There is no audible sound produced by the magnetic fluid imaging system, as is in the case of ball bearings. In embodiments, the present techniques result in a larger correction angle for optical image stabilization via a combination of tilt and XY shifting. Wire spring or ball or ball bearing would not allow tilting and shift simultaneously.

Example 1 is an apparatus for magnetic fluid optical image stabilization and autofocus. The apparatus includes a magnet; a ferrofluid surrounding the magnet; and a coil disposed near the ferrofluid, wherein in response to a current through coil, the magnet and ferrofluid are to shift a lens.

Example 2 includes the apparatus of example 1, including or excluding optional features. In this example, the apparatus includes a pocket to hold the ferrofluid and the magnet.

Example 3 includes the apparatus of any one of examples 1 to 2, including or excluding optional features. In this example, the current through the coil is to generate a magnetic field having a magnetic flux to cause movement of the magnet.

Example 4 includes the apparatus of any one of examples 1 to 3, including or excluding optional features. In this example, in response to a current through coil, the magnet is to shift and tilt a lens.

Example 5 includes the apparatus of any one of examples 1 to 4, including or excluding optional features. In this example, the ferrofluid is to enable a counterforce for an autofocus functionality.

Example 6 includes the apparatus of any one of examples 1 to 5, including or excluding optional features. In this example, the coil is a first coil, the magnet is a first magnet, and the magnetic field is a first magnetic field, further comprising: a second coil to generate a second magnetic field; and a second magnet to direct a propagation of the second magnetic field. Optionally, the first coil and the first magnet are located at one end of a moving platform, and the second coil and the second magnet are located at the opposite end of the moving platform, wherein the platform is coupled with a lens system including the lens.

Example 7 includes the apparatus of any one of examples 1 to 6, including or excluding optional features. In this example, the current through the coil is to generate a magnetic field to move the magnet and lens in a Z direction to enable a focus function.

Example 8 includes the apparatus of any one of examples 1 to 7, including or excluding optional features. In this example, the current through the coil is to generate a magnetic field to move the magnet and the lens in an X direction, and a second coil and second magnetic field is to move a second magnet and the lens in a Y direction to enable an optical image stabilization function.

Example 9 includes the apparatus of any one of examples 1 to 8, including or excluding optional features. In this example, the current through the coil is to generate a magnetic field to tilt the magnet and lens in along Z direction to enable an optical image stabilization function.

Example 10 includes the apparatus of any one of examples 1 to 9, including or excluding optional features. In this example, the apparatus includes a plurality of coiling to enable both a tilt and shift for optical image stabilization.

Example 11 is a system for magnetic fluid optical image stabilization and autofocus. The system includes a moving platform coupled with a lens system; a plurality of magnets coupled to the moving platform; a plurality of ferrofluid pockets surrounding each magnet; and a plurality of coils disposed near each pocket of ferrofluid, wherein in response to a current through a coil, a magnetic field causes a corresponding magnet to shift the moving platform.

Example 12 includes the system of example 11, including or excluding optional features. In this example, the current through a coil is to cause an elevation of a magnet, the moving platform, and the lens system for a focus function.

Example 13 includes the system of any one of examples 11 to 12, including or excluding optional features. In this example, the current through the plurality of coils is to cause a shift of a magnet, the moving platform, and the lens system for an optical image stabilization function.

Example 14 includes the system of any one of examples 11 to 13, including or excluding optional features. In this example, in response to a current through coil, the magnet is to shift and tilt a lens.

Example 15 includes the system of any one of examples 11 to 14, including or excluding optional features. In this example, the ferrofluid is to enable a counterforce for an autofocus functionality.

Example 16 includes the system of any one of examples 11 to 15, including or excluding optional features. In this example, the current through the coil is to generate a magnetic field to move the magnet and lens in a Z direction to enable a focus function.

Example 17 includes the system of any one of examples 11 to 16, including or excluding optional features. In this example, the current through the coil is to generate a magnetic field to move the magnet and the lens in an X direction, and a second coil and second magnetic field is to move a second magnet and the lens in a Y direction to enable an optical image stabilization function.

Example 18 includes the system of any one of examples 11 to 17, including or excluding optional features. In this example, the current through the coil is to generate a magnetic field to tilt the magnet and lens in along Z direction to enable an optical image stabilization function.

Example 19 includes the system of any one of examples 11 to 18, including or excluding optional features. In this example, the system includes a plurality of coiling to enable both a tilt and shift for optical image stabilization.

Example 20 is a method for magnetic fluid optical image stabilization and autofocus. The method includes disposing a magnet within a magnetic fluid, wherein the magnet is coupled with a lens system; positioning a coil near the magnet; and in response to a current through the coil, enable a focus or an optical image stabilization function.

Example 21 includes the method of example 20, including or excluding optional features. In this example, the current through a coil is to cause an elevation of a magnet and the lens system to enable the focus function.

Example 22 includes the method of any one of examples 20 to 21, including or excluding optional features. In this example, the current through the coil is to cause a shift of the magnet and the lens system for an optical image stabilization function.

Example 23 includes the method of any one of examples 20 to 22, including or excluding optional features. In this example, in response to a current through a plurality of coils, a plurality of magnets is to enable both a shift and tilt of the lens system.

Example 24 includes the method of any one of examples 20 to 23, including or excluding optional features. In this example, the magnetic fluid is to enable a counterforce for the focus function.

Example 25 includes the method of any one of examples 20 to 24, including or excluding optional features. In this example, the current through the coil is to generate a magnetic field to move the magnet and lens system in a Z direction to enable a focus function.

Example 26 includes the method of any one of examples 20 to 25, including or excluding optional features. In this example, the current through the coil is to generate a magnetic field to move the magnet and the lens in an X direction, and a second coil and second magnetic field is to move a second magnet and the lens in a Y direction to enable an optical image stabilization function.

Example 27 includes the method of any one of examples 20 to 26, including or excluding optional features. In this example, the current through the coil is to generate a magnetic field to tilt the magnet and lens in along Z direction to enable an optical image stabilization function.

Example 28 includes the method of any one of examples 20 to 27, including or excluding optional features. In this example, the method includes a plurality of coils to enable both a tilt and shift for optical image stabilization.

Example 29 includes the method of any one of examples 20 to 28, including or excluding optional features. In this example, the magnetic fluid is a ferrofluid.

Example 30 is an apparatus for magnetic fluid optical image stabilization and autofocus. The apparatus includes a magnet; a means to react to a magnetic field surrounding the magnet; and a coil disposed near the means to react to a magnetic field, wherein in response to a current through coil, the magnet and the means to react to a magnetic field are to shift a lens.

Example 31 includes the apparatus of example 30, including or excluding optional features. In this example, the apparatus includes a pocket to hold the means to react to a magnetic field and the magnet.

Example 32 includes the apparatus of any one of examples 30 to 31, including or excluding optional features. In this example, the current through the coil is to generate a magnetic field having a magnetic flux to cause movement of the magnet.

Example 33 includes the apparatus of any one of examples 30 to 32, including or excluding optional features. In this example, in response to a current through coil, the magnet is to shift and tilt a lens.

Example 34 includes the apparatus of any one of examples 30 to 33, including or excluding optional features. In this example, the means to react to a magnetic field is to enable a counterforce for an autofocus functionality.

Example 35 includes the apparatus of any one of examples 30 to 34, including or excluding optional features. In this example, the coil is a first coil, the magnet is a first magnet, and the magnetic field is a first magnetic field, further comprising: a second coil to generate a second magnetic field; and a second magnet to direct a propagation of the second magnetic field. Optionally, the first coil and the first magnet are located at one end of a moving platform, and the second coil and the second magnet are located at the opposite end of the moving platform, wherein the platform is coupled with a lens system including the lens.

Example 36 includes the apparatus of any one of examples 30 to 35, including or excluding optional features. In this example, the current through the coil is to generate a magnetic field to move the magnet and lens in a Z direction to enable a focus function.

Example 37 includes the apparatus of any one of examples 30 to 36, including or excluding optional features. In this example, the current through the coil is to generate a magnetic field to move the magnet and the lens in an X direction, and a second coil and second magnetic field is to move a second magnet and the lens in a Y direction to enable an optical image stabilization function.

Example 38 includes the apparatus of any one of examples 30 to 37, including or excluding optional features. In this example, the current through the coil is to generate a magnetic field to tilt the magnet and lens in along Z direction to enable an optical image stabilization function.

Example 39 includes the apparatus of any one of examples 30 to 38, including or excluding optional features. In this example, the apparatus includes a plurality of coiling to enable both a tilt and shift for optical image stabilization.

In the above description and the following claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices.

An embodiment is an implementation or example. Reference in the present specification to "an embodiment", "one embodiment", "some embodiments", "various embodiments", or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for magnetic fluid optical image stabilization and autofocus, comprising:
   a magnet;
   a ferrofluid surrounding the magnet; and
   a coil disposed near the ferrofluid, wherein in response to a current through the coil, the magnet and ferrofluid are to shift and tilt a lens.

2. The apparatus of claim 1, further comprising a pocket to hold the ferrofluid and the magnet.

3. The apparatus of claim 1, wherein the current through the coil is to generate a magnetic field having a magnetic flux to cause movement of the magnet.

4. The apparatus of claim 1, wherein the ferrofluid is to enable a counterforce for an autofocus functionality.

5. The apparatus of claim 1, wherein the coil is a first coil, the magnet is a first magnet, and the magnetic field is a first magnetic field, further comprising:
   a second coil to generate a second magnetic field; and
   a second magnet to direct a propagation of the second magnetic field.

6. The apparatus of claim 5, wherein the first coil and the first magnet are located at one end of a moving platform, and the second coil and the second magnet are located at the opposite end of the moving platform, wherein the platform is coupled with a lens system including the lens.

7. The apparatus of claim 1, wherein the current through the coil is to generate a magnetic field to move the magnet and lens in a Z direction to enable a focus function.

8. The apparatus of claim 1, wherein the current through the coil is to generate a magnetic field to move the magnet and the lens in an X direction, and a second coil and second magnetic field is to move a second magnet and the lens in a Y direction to enable an optical image stabilization function.

9. The apparatus of claim 1, wherein the current through the coil is to generate a magnetic field to tilt the magnet and lens in along Z direction to enable an optical image stabilization function.

10. The apparatus of claim 1, further comprising a plurality of coiling to enable both a tilt and shift for optical image stabilization.

11. A system for magnetic fluid optical image stabilization and autofocus, comprising:
    a moving platform coupled with a lens system;
    a plurality of magnets coupled to the moving platform;
    a plurality of ferrofluid pockets surrounding each magnet; and
    a plurality of coils disposed near each pocket of ferrofluid, wherein in response to a current through a coil, a magnetic field causes a corresponding magnet to shift the moving platform and the ferrofluid is to enable a counterforce for an autofocus functionality.

12. The system of claim 11, wherein the current through a coil is to cause an elevation of a magnet, the moving platform, and the lens system for a focus function.

13. The system of claim 11, wherein the current through the plurality of coils is to cause a shift of a magnet, the moving platform, and the lens system for an optical image stabilization function.

14. The system of claim 11, wherein in response to a current through the plurality of coils, the plurality of magnets are to shift and tilt a lens.

15. The system of claim 11, wherein the current through the plurality of coils is to generate a magnetic field to move the magnet and lens in a Z direction to enable a focus function.

16. The system of claim 11, wherein the current through the plurality of coils is to generate a magnetic field to move the magnet and the lens in an X direction, and a second coil and second magnetic field is to move a second magnet and the lens in a Y direction to enable an optical image stabilization function.

17. The system of claim 11, wherein the current through the plurality of coils is to generate a magnetic field to tilt the magnet and lens in along Z direction to enable an optical image stabilization function.

18. The system of claim 11, further comprising a plurality of coiling to enable both a tilt and shift for optical image stabilization.

19. A method for magnetic fluid optical image stabilization and autofocus, comprising:
 disposing a magnet within a magnetic fluid, wherein the magnet is coupled with a lens system;
 positioning a coil near the magnet; and
 in response to a current through the coil, enable a focus or an optical image stabilization function, wherein the current through the coil is to cause a shift of the magnet and the lens system for an optical image stabilization function.

20. The method of claim 19, wherein the current through the coil is to cause an elevation of a magnet and the lens system to enable the focus function.

21. The method of claim 19, wherein in response to a current through a plurality of coils, a plurality of magnets is to enable both a shift and tilt of the lens system.

22. The method of claim 19, wherein the magnetic fluid is to enable a counterforce for the focus function.

* * * * *